United States Patent
Strand et al.

(10) Patent No.: US 6,221,279 B1
(45) Date of Patent: Apr. 24, 2001

(54) PIGMENT PARTICLES FOR INVISIBLE MARKING APPLICATIONS

(75) Inventors: Marc Alan Strand; Crystal Leigh Kendrick; Michael John Cyr, all of Kingsport, TN (US)

(73) Assignee: Isotag Technology, Inc., Houston, TX (US)

(*) Notice: Subject to any disclaimer, the term of this patent is extended or adjusted under 35 U.S.C. 154(b) by 0 days.

(21) Appl. No.: 09/339,125

(22) Filed: Jun. 24, 1999

(51) Int. Cl.⁷ .............................. C09K 11/06; C09B 69/10
(52) U.S. Cl. .................. 252/301.16; 101/491; 427/157; 106/31.15; 106/31.65; 106/499; 106/413
(58) Field of Search ................. 252/301.35, 301.16; 106/31.15, 31.64, 499, 413; 101/471; 427/157

(56) References Cited

U.S. PATENT DOCUMENTS

| | | | |
|---|---|---|---|
| 3,764,576 | 10/1973 | Russo | 260/40 R |
| 3,812,051 | 5/1974 | Merkle et al. | 252/301.35 |
| 3,812,053 | 5/1974 | Siegfried et al. | 252/301.35 |
| 3,838,063 | 9/1974 | Foss | 252/301.35 |
| 3,873,491 | 3/1975 | Gall | 260/40 R |
| 3,922,323 | 11/1975 | Schein | 252/301.35 |
| 4,044,073 | 8/1977 | Baron et al. | 260/860 |
| 4,107,149 | 8/1978 | Bier et al. | 528/309 |
| 4,117,194 | 9/1978 | Barbe et al. | 428/374 |
| 4,186,168 | 1/1980 | Barbe et al. | 264/168 |
| 4,254,290 | 3/1981 | Chambers et al. | 568/866 |
| 4,346,213 | 8/1982 | Hall, Jr. et al. | 528/272 |
| 4,351,758 | 9/1982 | Lu et al. | 524/227 |
| 4,369,280 | 1/1983 | Dieck et al. | 524/281 |
| 4,439,597 | 3/1984 | Hall, Jr. et al. | 528/272 |
| 4,444,931 | 4/1984 | Lu et al. | 524/227 |
| 4,485,212 | 11/1984 | Wefer | 252/64 |
| 4,499,261 | 2/1985 | Heinze et al. | 528/279 |
| 4,536,531 | 8/1985 | Ogawa et al. | 524/135 |
| 4,547,547 | 10/1985 | Chen et al. | 524/538 |
| 4,599,375 | 7/1986 | Berte et al. | 524/100 |
| 4,622,179 | 11/1986 | Eda | 540/139 |
| 4,654,413 | 3/1987 | Takahashi | 528/274 |
| 4,656,241 | 4/1987 | Iida et al. | 528/279 |
| 4,713,408 | 12/1987 | Takahashi et al. | 524/161 |
| 4,739,012 | 4/1988 | Hagman | 524/92 |
| 4,742,109 | 5/1988 | Takahashi et al. | 524/504 |
| 4,814,441 | 3/1989 | Hauser et al. | 540/122 |
| 4,942,188 | 7/1990 | Hamersma et al. | 523/212 |
| 4,954,542 | 9/1990 | Bohen et al. | 524/89 |
| 5,030,670 | 7/1991 | Hirahara et al. | 528/176 |
| 5,032,670 | 7/1991 | Parham et al. | 528/220 |
| 5,034,439 | 7/1991 | Breitenfellner et al. | 524/94 |
| 5,093,147 | 3/1992 | Andrus et al. | 427/7 |
| 5,096,653 | 3/1992 | Nedzu | 264/564 |
| 5,101,064 | 3/1992 | Dupont et al. | 560/78 |
| 5,102,980 | 4/1992 | Krutak et al. | 528/272 |

(List continued on next page.)

FOREIGN PATENT DOCUMENTS

WO 92/07913 * 5/1992 (WO).

Primary Examiner—C. Melissa Koslow
(74) Attorney, Agent, or Firm—John R Casperson; Mark L. Davis

(57) ABSTRACT

A pigment composition includes a crystalline thermoplastic polyester resin having residues of at least one dicarboxylic acid and a near-infrared fluorescing compound having a fluorescence between about 650 nm to about 2500 nm associated with the crystalline thermoplastic polyester, wherein the polyester has an intrinsic viscosity (IV) of less than about 0.37. A preferred polyester is polybutylene terephthalate. Another aspect is a method for providing a detectable or identifiable marking that is invisible to the unaided eye on a surface of a substrate is also provided. The method includes the steps of applying to the surface a marking composition comprising a suitably compatible marking fluid containing the fluorescent pigment composition. The near infrared fluorescing pigment composition is useful in letterpress, flexographic and gravure printing applications.

13 Claims, 1 Drawing Sheet

U.S. PATENT DOCUMENTS

| | | | |
|---|---|---|---|
| 5,106,942 | 4/1992 | Krutak et al. | 528/272 |
| 5,108,806 | 4/1992 | Nedzu et al. | 428/352 |
| 5,108,818 | 4/1992 | Ebina et al. | 428/195 |
| 5,115,022 | 5/1992 | Bronstert et al. | 252/92 |
| 5,153,065 | 10/1992 | Abu-Isa | 528/364 |
| 5,162,424 | 11/1992 | de Boer et al. | 524/505 |
| 5,183,840 | 2/1993 | Erpelding et al. | 524/228 |
| 5,237,042 | 8/1993 | Kim et al. | 528/279 |
| 5,258,434 | 11/1993 | Hanabusa | 524/310 |
| 5,264,153 | 11/1993 | De Krom | 25/301.35 |
| 5,266,601 | 11/1993 | Kyber et al. | 521/48.5 |
| 5,273,810 | 12/1993 | Nakano et al. | 428/215 |
| 5,292,855 | 3/1994 | Krutak et al. | 528/289 |
| 5,319,128 | 6/1994 | Dupont et al. | 560/78 |
| 5,321,086 | 6/1994 | Kozakura et al. | 525/147 |
| 5,340,875 | 8/1994 | Yang et al. | 524/64 |
| 5,346,802 | 9/1994 | Ohbachi et al. | 430/270 |
| 5,378,854 | 1/1995 | Hamersma et al. | 428/483 |
| 5,397,819 * | 3/1995 | Krutak et al. | 524/88 |
| 5,420,199 | 5/1995 | Fujie | 525/67 |
| 5,422,161 | 6/1995 | Ohbachi et al. | 428/141 |
| 5,441,997 | 8/1995 | Walsh et al. | 524/147 |
| 5,442,000 | 8/1995 | Kato et al. | 524/291 |
| 5,460,646 | 10/1995 | Lazzouni et al. | 106/21 R |
| 5,470,502 | 11/1995 | Hahn et al. | 252/301.35 |
| 5,553,714 * | 9/1996 | Cushman et al. | 209/577 |
| 5,837,042 * | 11/1998 | Lent et al. | 106/31.15 |

\* cited by examiner

PIGMENT PARTICLES FOR INVISIBLE MARKING APPLICATIONS

FIELD OF THE INVENTION

The present invention relates to a pigment composition for invisibly marking a substrate and more particularly to a modified thermoplastic polyester containing a near infrared fluorescing compound. Advantageously, the pigment can be milled to a finely divided solid having an average particle size of less than about 20 microns. The pigment of the present invention may be used as a security ink or for document authentication, sensing marks, invisible identification marks or admixed into plastics and the like. The pigment may be applied using known techniques such as letterpress, flexographic, lithographic and gravure.

BACKGROUND OF THE INVENTION

Fluorescent pigments are will known in commerce and have many uses. Pigments prepared from a frangible polymer into which a fluorescent dye has been dissolved are particularly well known. The dyes are usually those which fluoresce in daylight to produce very brilliant colors. They are widely used in inks and coatings, especially for outdoor signs. U.S. Pat. Nos. 5,470,502; 3,922,232; 3,812,051 and 3,812,053 are but a few patents that disclose these types of fluorescent dyes.

In recent years, there has been a great deal of interest in methods for marking various products and substrates in a way that the markings are poorly visible or invisible in the visible wavelength, i.e., 400 nm to about 700 nm but which may be detected by means of their fluorescence when they are excited or irradiated with an energy in the near infrared or infrared wavelength region. For example, U.S. Pat. No. 5,093,147 describes an ink containing dyes which are poorly absorptive of radiation in the visible range of about 400 nm to 700 nm but are highly absorptive of radiation in the near infrared range of at least about 750 nm. Those materials which absorb radiation in the near infrared range of 650–1100 nm and fluoresce at a somewhat longer wavelength than that at which they absorb are referred to as near infrared fluorophores.

U.S. Pat. No. 5,525,516 discloses a method for imparting invisible markings for identification purposes to petroleum hydrocarbons using one or more infrared fluorophores selected from the classes of phthalocyanines, squaraines and naphthalocyanines.

Near infrared fluorescing compounds may be mono or multi-functional and may be copolymerized into a variety of condensation polymers. Suitably functionalized near infrared fluorescing compounds may be incorporated into certain polyesters to render the near infrared fluorescing compounds water dispersible. For example, U.S. Pat. No. 5,614,008 discloses an ink composition having a water dissipatable polyester having a near infrared compound copolymerized in the polyester. The ink is useful for invisibly marking a variety of substrates.

U.S. Pat. No. 5,461,136 discloses a method for tagging thermoplastic containers using a near infrared fluorescing compound that is admixed or copolymerized with the thermoplastic material. The incorporation of such near infrared fluorescing compounds into the thermoplastic assists in the separating and sorting of thermoplastic containers such as bottles.

Accordingly, there is a need for a pigmentary form of a near infrared fluorescing compound that may be used in various printing applications and ink formulations.

SUMMARY OF THE INVENTION

The present invention provides a fluorescent pigment composition that is useful for identification tagging various substrates where use of a pigment would be beneficial, such as for example, letterpress applications, lithographic applications, thermal transfer applications, and gravure printing operations. Briefly, the fluorescent pigment composition includes a crystalline thermoplastic polyester resin having residues of at least one dicarboxylic acid and having an intrinsic viscosity (IV) of less than about 0.37; and a near-infrared fluorescing compound having a fluorescence between about 650 nm to about 2500 nm associated with the crystalline thermoplastic polyester.

Another aspect of the present invention there is provided a method for marking a surface of a substrate with an ink composition which includes the pigment composition of the present invention. The method includes the steps of providing a near infrared fluorescing pigmentary compound and applying the pigment compound to a substrate.

It is an object of the invention to provide a thermoplastic pigment having a near infrared fluorescing compound associated with the thermoplastic.

It is another object of the invention to provide a thermoplastic pigment that may be milled to a size of less than about 20 microns.

Yet another object of the invention is to provide a method for marking a substrate using a pigment composition containing a near infrared fluorescing compound.

It is another object of the invention to provide a polyester pigment having a near infrared fluorescing compound associated with the polyester having improved compatibility with thermoplastic materials.

Numerous other objects and advantages of the present invention will become readily apparent from the following detailed description of the preferred embodiments and the appended claims.

BRIEF DESCRIPTION OF THE DRAWING

The drawing is a graphic representation illustrating the effect of particle size and detection as determined by fluorescence signal strength.

DETAILED DESCRIPTION OF THE PREFERRED EMBODIMENTS

Figure 1:
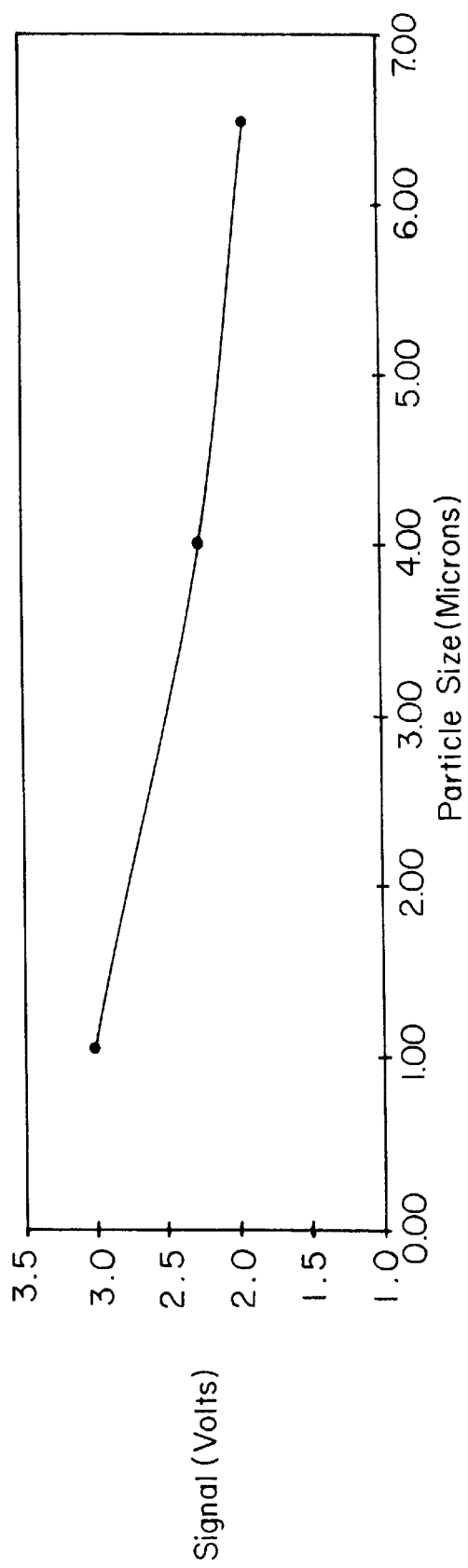

Although the present invention is susceptible to different embodiments, it is to be understood that the present disclosure is to be considered as an exemplification of the principles of the invention and is not intended to limit the invention to the embodiments illustrated.

According to the present invention, there has been discovered an improved fluorescent marking pigment having improved heat and light stability. Accordingly, the pigment composition includes a crystalline thermoplastic polyester resin having residues of at least one dicarboxylic acid and having an intrinsic viscosity (IV) of less than about 0.37; and a near-infrared fluorescing compound having a fluorescence between about 650 nm to about 2500 nm associated with the crystalline thermoplastic polyester. Polyesters suitable for use herein are derived from an aliphatic or cycloaliphatic diol, or mixtures thereof containing from 2 to about 10 carbon atoms and at least one aromatic dicarboxylic acid. The useful types of polyesters of this invention can be linear, thermoplastic, crystalline or amorphous, with crystalline being preferred.

The diol components of the polyester may be comprised of, for example, ethylene glycol, 1,4-cyclohexanedimethanol, 1,2-propanediol, 1,4-butanediol, 1,3-propanediol, 2-methyl-1,3-propanediol, 1,6-hexanediol, 1,2-cyclohexanediol, 1,4-cyclohexanediol, 1,10-decanediol, 1,2-cyclohexanedimethanol, 1,3-cyclohexanedimethanol, X,8-bis-(hydroxymethyl)-tricyclo-[5.2.1.0]-decane wherein X represents 3, 4, or 5; and diols containing one or more oxygen atoms in the chain, e.g., diethylene glycol, triethylene glycol, dipropylene glycol, or tripropylene glycol and the like. In general, these diols contain 2 to 18, preferably 2 to 12 carbon atoms. Cycloaliphatic diols can be employed in their cis or trans configuration or as a mixture of both forms.

The polyester can contain repeating units of a poly (ethylene glycol) of the formula $H\text{—}(OCH_2\text{—}CH_2)_n\text{—}OH$ wherein n is an integer of 2 to 500. The value of n is preferably from between about 2 to about 20. The values of n and the mole percent of poly(ethylene glycol) in the polyester, if used, are adjusted such that the mole percent of poly(ethylene glycol) within the stated range is inversely proportional to the quantity of n within the stated ranges. Thus, when the mole percent is high, the value of n is low. On the other hand, if the mole percent is low, the value of n is high. It is apparent, therefore, that the weight percent (product of mole percent and molecular weight) of the poly(ethylene glycol) is an important consideration. Examples of suitable poly(ethylene glycols) include relatively high molecular weight polyethylene glycols, some of which are available commercially under the designation CARBOWAX, a product of Union Carbide. Diethylene glycol is also especially suitable.

The acid components (aliphatic, alicyclic, or aromatic dicarboxylic acids) of the polyester may be comprised of, e.g., terephthalic acid, naphthalene-2,6-dicarboxylic acid, isophthalic acid, 1,4-cyclohexanedicarboxylic acid, 1,3-cyclohexane dicarboxylic acid, succinic acid, glutaric acid, adipic acid, sebacic acid, 1,12-dodecanedioic acid, and the like. In place of the dicarboxylic acids themselves, it is possible and often preferable to use a functional acid derivative thereof such as the dimethyl, diethyl, or dipropyl ester of the dicarboxylic acid. The anhydrides and acid chlorides of the dicarboxylic acids can likewise be employed.

The dicarboxylic acid component of the polyester may optionally be modified with up to about 15 mole percent of one or more different dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, cyclohexanedicarboxylic acid, cyclohexanediacetic acid, diphenyl-4,4'-dicarboxylic acid, succinic acid, glutaric acid, adipic acid, azelaic acid, sebacic acid, mixtures thereof and the like.

The polyesters can be produced using typical polycondensation techniques well known in the art. The most preferred polyester is poly(1,4 butylene terephthalate) (PBT). The term "polybutylene terephthalate" as used herein contemplates substantially linear polyesters comprised of units derived from terephthalic acid and 1,4-butanediol. The aforesaid term also includes copolyesters in which up to 40 mole percent of the terephthalic acid is replaced with one or more other copolycondensable polycarboxylic acids and/or up to 40 mole percent of the 1,4-butanediol is replaced with one or more other copolycondensable polyols. Examples of other copolycondensable polycarboxylic acids include isophthalic acid, adipic acid, sebacic acid, azelaic acid, dodecane dicarboxylic acid, hexahydroterephthalic acid, phenylindanedicarboxylic acid, trimellitic acid, trimesic acid and 2,6-naphthalenedicarboxylic acid. Examples of other copolycondensable polyols include ethylene glycol, 1,3-propylene glycol, neopentyl glycol, pentaerythritol and 1,6-hexanediol. Method for making PBT are described in greater detail in U.S. Pat. Nos. 4,439,597; 4,656,241 and 5,237,042, the entire disclosures of which are incorporated herein by reference.

Desirably, the thermoplastic polyester resin has a crystallinity greater than about 25%, preferably greater than about 35% and more preferably greater than about 50%. It is critical to the present invention that the thermoplastic polyester have an intrinsic viscosity of less than 0.37 and preferably is from about 0.10 to about 0.35 and more preferably from about 0.12 to about 0.25. The molecular weight of the resins is relatively low e.g. between 500–50,000. In a preferred embodiment the molecular weight ranges between 500–5,000. A typical molecular weight is about 3,000. These molecular weights are number average molecular weights.

In accordance with the present invention the crystalline polyester and preferably the PBT includes at least one thermally stable, near infrared fluorescing compound, described in greater detail below. The levels of the near infrared fluorescing compound present in the final "tagged" thermoplastic composition may vary considerably depending upon the molar extinction coefficient and the fluorescing efficiency (i.e., fluorescent quantum yield) of the added fluorophore in the polymer matrix. It is generally desirable that the fluorophore be present at the lowest practical level needed to produce a satisfactory fluorescence detection level and minimize potential color problems resulting from the presence of the fluorophore in the thermoplastic and to minimize cost. The polyester can contain from about 10 ppm to about 30 weight % of the near infrared fluorescing compound and preferably contains from about 0.1 weight % to about 10 weight % of the near infrared fluorescing compound. Normally, with typical fluorescence efficiencies of between about 0.6 and 0.9 the near infrared fluorescing compound is added in the amount of from about 500 to about 5,000 ppm with 1500 to about 3000 ppm being preferred The near infrared fluorescing compound may be incorporated into the polymer chain using known techniques such as being admixed with the polymer or preferably by being copolymerized with the polyester to become part of the polymer chain using conventional techniques such as those employed to incorporate other additives into such resins. For example, the near infrared fluorescing compounds may be dry blended in the form of powders with the thermoplastic materials in the form of pellets or powders, with or without an adhesion promoter or a dispersing agent. This premix can be subsequently processed on extruders or molding machines. In some cases, solution blending may also be preferable. One skilled in the art will recognize that other conventional additives such as plasticizers, antioxidants, stabilizers, nucleating agents, etc., may also be present in the thermoplastic compositions of the invention without adversely effecting the near infrared fluorescing properties of the pigment particle. Advantageously, this provides a pigment where the near infrared fluorescing compound is not leachable, sublimable or extractable and will not migrate or exude from compositions containing the pigmentary composition.

The near-infrared fluorophore compound used in accordance with the invention should have excellent thermal stability and little light absorption in the visible region, i.e., they should impart little or no color to the treated materials. The most desired near-infrared fluorophores have a strong wavelength absorption of near-infrared light and have strong fluorescence in the near-infrared wavelengths of about 670–1100 nm. Suitable invisible marking compositions include near-infrared fluorophores such as those disclosed in U.S. Pat. Nos. 4,255,273; 5,292,855; 5,336,714; 5,397,819; 5,461,136; 5,525,516; 5,553,714 and 5,423,432, the entire disclosures of each being incorporated herein by reference.

The preferred near infrared fluorescent compound are selected from phthalocyanines, naphthalocyanines and squaraines corresponding to formulae I, II and III:

(I)

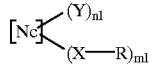
(II)

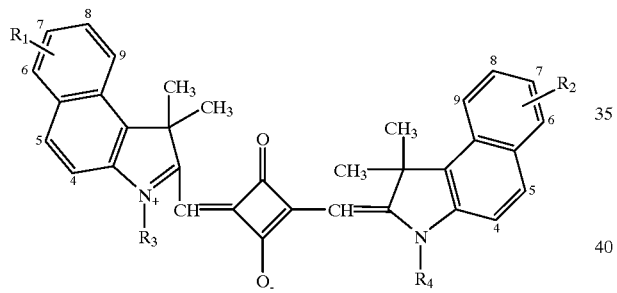
(III)

where Pc and Nc represent the phthalocyanine and naphthalocyanine moieties of Formulae Ia and IIa, Phthalocyanine

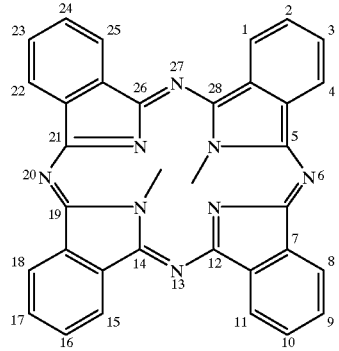
Ia 2,3-Naphthalocyanine

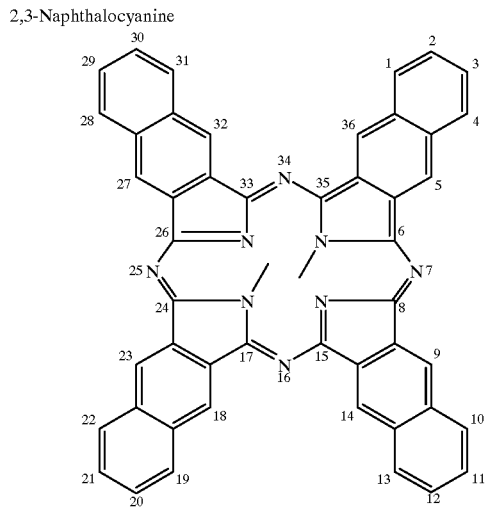
IIa respectively, covalently bonded to hydrogen or to various metals, halometals, organometallic groups, and oxymetals including AlCl, AlBr, AlOH, AlOR$_5$, AlSR$_5$, Ge, Ge(OR$_6$), Ga, InCl, Mg, SiCl$_2$, SiF$_2$, SnCl$_2$, Sn(OR$_6$)$_2$, Si(SR$_6$)$_2$, or Zn, wherein R$_5$ and R$_6$ are selected from hydrogen, alkyl, aryl, heteroaryl, lower alkanoyl, arylcarbonyl, arylaminocarbonyl, trifluoroacetyl, groups of the formulae:

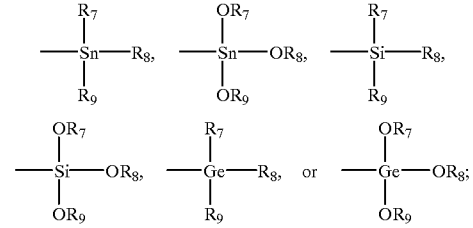

R$_7$, R$_8$, and R$_9$ are independently selected from alkyl, phenyl or phenyl substituted with lower alkyl, lower alkoxy or halogen.

X is selected from oxygen, sulfur, selenium, tellurium or a group of the formula N(R$_{10}$), wherein R$_{10}$ is hydrogen, cycloalkyl, alkyl, acyl, alkylsulfonyl, or aryl or R$_{10}$ and R taken together form an aliphatic or aromatic ring with the nitrogen atom to which they are attached.

Y is selected from alkyl, aryl, heteroaryl, halogen or hydrogen.

R is selected from hydrogen, unsubstituted or substituted alkyl, alkenyl, alkynyl, C$_3$–C$_8$ cycloalkyl, aryl, herteroaryl,

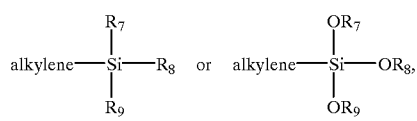

or (X—R) moiety is alkylsulfonylamino, arylsulfonylamino, or a group selected from the formulae —X(C$_2$H$_4$O)$_z$R$^1$,

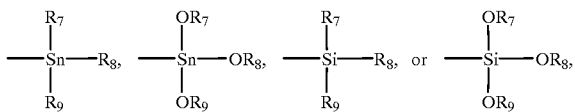

wherein R$^1$ is hydrogen or R is as defined above; z is an integer from 1 to 4.

Further, two (X—R) moieties can be taken together to form divalent substituents of the formula:

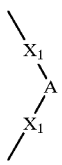

wherein each X$_1$ is independently selected from —O—, —S—, or —N(R$_{10}$)— and A is selected from ethylene; propylene; trimethylene; and such groups substituted with C$_1$–C$_4$ alkyl, C$_1$–C$_4$ alkoxy, aryl and cycloalkyl; 1,2-phenylene and 1,2-phenylene containing 1–3 substituents selected from C$_1$–C$_4$ alkyl, C$_1$–C$_4$ alkoxy or halogen.

The R$_1$ and R$_2$ moieties are independently selected from hydrogen, lower alkyl, lower alkoxy, halogen, aryloxy, lower alkylthio, arylthio, lower alkylsulfonyl; arylsulfonyl; lower alkylsulfonylamino, lower alkanoylamine, arylsulfonylamino, cycloalkylsulfonylamino, carboxy, unsubstituted and substituted carbamoyl and sulfamoyl, lower alkoxycarbonyl, hydroxy, lower alkanoyloxy, and groups of the formulae

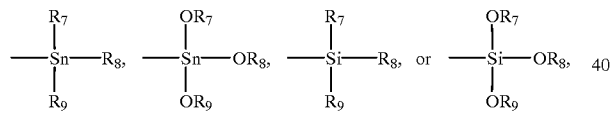

The R$_3$ and R$_4$ moieties are independently selected from hydrogen, lower alkyl, alkenyl or aryl; n is an integer from 0–16; n$_1$ is an integer from 0–24, provided the sums of n+m and n$_1$+m, are 16 and 24, respectively. It is to be understood that when n, m, n$_1$ or m$_1$ is 0, the respective moiety is absent.

In a preferred embodiment of this aspect of the present invention, m is from 4 to 12; m$_1$ is from 0–8; provided that in the definitions of the substituents (Y)n, (Y)n$_1$ and (X—R) m$_1$ that these substituents are not present when n, n$_1$, and m$_1$ are zero, respectively. Substituents (X—R) and (Y) are present in compounds Ia on there peripheral carbon atoms, i.e., in positions 1–4, 8–11, 15–18, 22–25 and substituents (X—R) and (Y) are present on the peripheral carbon atoms of IIa, i.e., in positions 1–5, 9–14, 18–23, 27–32 and 36.

Phthalocyanines and naphthalocyanines are preferred as the marking compound particularly where stability to UV radiation or sunlight is desirable.

In another embodiment of the invention, the near infrared fluorescing compound is a squaraine compound of formula III, wherein R$_1$ and R$_2$ are independently selected from carboxy or lower alkoxycarbonyl.

In the above definitions, the term alkyl is used to designate a straight or branched chained hydrocarbon radical containing 1–12 carbons.

In the terms lower alkyl, lower alkoxy, lower alkylthio, lower alkoxycarbonyl, lower alkylsufonyl, lower alkylsufonylamino, lower alkanoylamino, lower alkanoyl and lower alkanoyloxy the alkyl portion of the groups contains 1–6 carbons and may contain a straight or branched chain.

The term "cycloalkyl" is used to represent a cyclic aliphatic hydrocarbon radical containing 3–8 carbons, preferably 5 to 7 carbons.

The alkyl and lower alkyl portions of the previously defined groups may contain as further substituents one or more groups selected from hydroxy, halogen, carboxy, cyano, C$_1$–C$_4$-alkoxy, aryl, C$_1$–C$_4$-alkylthio, arylthio, aryloxy, C$_1$–C$_4$-alkoxycarbonyl or C$_1$–C$_4$-alkanoyloxy.

The term "aryl" includes carbocyclic aromatic radicals containing 6–18 carbons, preferably phenyl and naphthyl, and such radicals substituted with one or more substituents selected from lower alkyl, lower alkoxy, halogen, lower alkylthio, N(lower alkyl)$_2$, trifluro-methyl, carboxy, lower alkoxycarbonyl, hydroxy, lower alkanoylamino, lower alkylsulfonylamino, arylsulfonylamino, cycloalkylsulfonylamino, lower alkanoyloxy, cyano, phenyl, phenylthio and phenoxy.

The term "heteroaryl" is used to represent mono or bicyclic hetero aromatic radicals containing at least one "hetero" atom selected from oxygen, sulfur and nitrogen or a combination thereof. Examples of suitable hetero-aryl groups include: thiazolyl, benzo-thiazolyl, pyrazolyl, pyrrolyl, thienyl, furyl, thiadiazolyl, oxadiazolyl, benzoxazolyl, benzimidazolyl, pyridyl, pyrimidinyl and triazolyl. These heteroaryl radicals may contain the same substituents listed above as possible substituents for the aryl radicals. The term triazolyl also includes structure IV and mixed isomers thereof,

IV

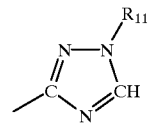

wherein R$_{11}$ is hydrogen or selected from lower alkyl and lower alkyl substituted with one or two groups selected from hydroxy, halogen, carboxy, lower alkoxy, aryl, cyano, cycloalkyl, lower alkanoyloxy or lower alkoxycarbonyl.

The terms "alkenyl and alkynyl" are used to denote aliphatic hydrocarbon moiety having 3–8 carbons and containing at least one carbon—carbon double bond and one carbon—carbon triple bond, respectively.

The term "halogen" is used to include bromine, chlorine, fluorine and iodine.

The term "substitued alkyl" is used to denote a straight or branched chain hydrocarbon radical containing 1–12 carbon atoms and containing as substituents 1 or 2 groups selected from hydroxy, halogen, carboxy, cyano, C$_1$–C$_4$ alkoxy, aryl, C$_1$–C$_4$ alkylthio, arythio, aryloxy, C$_1$–C$_4$ alkoxycarbonyl, or C$_1$–C$_4$ alkanoyloxy.

The term "substituted carbamoyl" is used to denote a radical having the formula —CONR$_{12}$R$_{13}$, wherein R$_{12}$ and R$_{13}$ are selected from unsubstituted or substituted alkyl, alkenyl, alkynyl, cycloalkyl, aryl, or heteroaryl.

The term "substituted sulfamoyl" is used to denote a radical having the formula —SO2NR$_2$R$_{13}$, wherein R$_{12}$ and R$_{13}$ are as defined above.

The term "alkylene" refers to a divalent C$_1$–C$_{12}$ aliphatic hydrocarbon moiety, either straight or branched-chain, and either unsubstituted or substituted with one or more groups selected from lower alkoxy, halogen, aryl, or aryloxy.

The term "acyl" refers to a group of the formula R°C(O)—O—, wherein R° is preferably a $C_1$–$C_{10}$ alkyl moiety. The term "alkyl sulfonyl" refers to a group of the formula R°SO2—, wherein R° is as defined for acyl.

The fluorescent dyes mentioned can be present in the novel fluorescent pigments either each on its own or else mixed with others. Similarly, the fluorescent pigments according to the present invention may contain only one of the polymer matrices mentioned or else mutual mixtures thereof.

The tagged thermoplastic material is typically collected in bulk which is then comminuted using conventional milling processes known to those skilled in the art. The fluorescent pigments according to the present invention desirably have a mean particle size of less than about 20 microns. Desirably, the fluorescent pigments have a mean particle size ranging from about 0.1 microns to about 10 microns with a particle size of from about 0.1 to about 5 microns being preferred. Such particle sizes may be obtained using conventional jet milling techniques alone or in combination with other grinding techniques known to those skilled in the art.

In another aspect of the invention a method is provided for marking the surface of a substrate with an ink or marking composition that is invisible to the unaided eye. The method includes the steps of applying to the surface of the substrate an ink or marking composition containing the pigmentary composition of the present invention. Typically, the ink is applied to the substrate surface using letterpress, flexographic and gravure techniques.

The following examples are intended to further illustrate the practice of the invention and are not intended to be a limitation thereon.

EXAMPLE 1

In this example a first pigment in accordance with the present invention was produced having a near infrared fluorescing compound copolymerized into the polyester backbone. The pigment was made by adding dimethyl terephthalate (DMT, 97.0 g. 0.5 moles); 1,4 butanediol (67.5 g, 0.75 moles); 1(4), 8(11), 15(18), 22(25) tetra[4(2 ethylhexylcarbonyl) phenoxy] phthalocyanine ($PcH_2$)(0.275 g); and 0.44 g of a 2.5 wt % solution of tetraisopropyl titanate in butanol to a clean, dry 500 ml round bottom flask. The flask was placed in an appropriate setup equipped with mechanical stirring, a uniform heat source, vacuum capability and inert gas purge capability. The reaction mix was heated to 220° C. and held at atmospheric pressure with a nitrogen gas purge for 60 minutes. The reaction temperature was then raised to 230° C. and held for an additional 15 minutes. The pressure was then reduced from atmospheric to 120 mm Hg over 10 minutes and held for an additional 10 minutes. The pressure was then reduced to 20 mm Hg over 10 minutes and then to 5 mm Hg over the next 10 minutes. The reaction was held under these conditions for 10 minutes. Nitrogen flow to the vessel was increased until the pressure returned to atmospheric and the reaction was terminated. The resultant molten polymer was poured from the flask into a suitable container for cooling and allowed to crystallize. This material had an intrinsic viscosity of about 0.18 and was mechanically ground using a Wiley Mill available from Thomas Scientific to a mean particle size of about 1.5 mm.

EXAMPLE 2

In this example a second pigment in accordance with the present invention was produced having a near infrared fluorescing compound copolymerized into the polyester backbone. The pigment was produced by adding dimethyl terephthalate (97.0 g. 0.5 moles); 1,4 butanediol (67.5 g, 0.75 moles); dihydroxy silicone naphthalocynine (J.A.C.S. 1984, 106,7404–7410) (0.33 g); and 0.44 g of a 2.5 wt % solution of tetraisopropyl titanate in butanol to a clean, dry 500 ml round bottom flask. The flask was placed in an appropriate setup equipped with mechanical stirring, a uniform heat source, vacuum capability and inert gas purge capability. The reaction mix was heated to 220° C. and held at atmospheric pressure with a nitrogen gas purge for 60 minutes. The reaction temperature was then raised to 250° C. and held for an additional 15 minutes. The pressure was then reduced from atmospheric to 120 mm Hg over 10 minutes and held for an additional 10 minutes. The pressure was then ramped down to 20 mm Hg over 10 minutes and then to 5 mm Hg over the next 10 minutes. The reaction was held under these conditions for 10 minutes. Nitrogen flow to the vessel was increased until the pressure returned to atmospheric and the reaction was terminated. The resultant molten polymer was poured from the flask into a suitable container for cooling and allowed to crystallize. This material had an intrinsic viscosity of about 0.18 and was mechanically ground using a Wiley Mill available from Thomas Scientific to a mean particle size of about 1.5 mm.

EXAMPLE 3

In this example a pigment in accordance with the invention was produced by adding dimethyl terephthalate (97.0 g. 0.5 moles); 1,4 butanediol (67.5 g, 0.75 moles); and and 0.44 g of a 2.5 wt % solution of tetraisopropyl titanate in butanol to a clean, dry 500 ml round bottom flask. The flask was placed in an appropriate setup equipped with mechanical stirring, a uniform heat source, vacuum capability and inert gas purge capability. The reaction mix was heated to 220° C. and held at atmospheric pressure with a nitrogen gas purge for 60 minutes. The reaction temperature was then raised to 230° C. and held for an additional 15 minutes. Just prior to reducing the pressure, 0.275 g of 1(4), 8(11), 15(18), 22(25) tetra[4(2 ethylhexylcarbonyl) phenoxy] phthalocyanine ($PcH_2$) were mixed with 10 g of butanol and added to the reaction. The pressure was reduced from atmospheric to 120 mm Hg over 10 minutes and held for an additional 10 minutes. The pressure was then ramped down to 20 mm Hg over 10 minutes and then to 5 mm Hg over the next 10 minutes. The reaction was held under these conditions for 10 minutes. Nitrogen flow to the vessel was increased until the pressure returned to atmospheric and the reaction was terminated. The resultant molten polymer was poured from the flask into a suitable container for cooling and allowed to crystallize. This material had an intrinsic viscosity of about 0.18 and was mechanically ground using a Wiley Mill available from Thomas Scientific to a mean particle size of about 1.5 mm.

EXAMPLE 4

In this example a pigment in accordance with the present invention was produced by adding dimethyl terephthalate (97.0 g. 0.5 moles); 1,4 butanediol (67.5 g, 0.75 moles); and 0.44 g of a 2.5 wt % solution of tetraisopropyl titanate in butanol to a clean, dry 500 ml round bottom flask. The flask was placed in an appropriate setup equipped with mechanical stirring, a uniform heat source, vacuum capability and inert gas purge capability. The reaction mix was heated to 210° C. and held at atmospheric pressure with a nitrogen gas purge for 75minutes. Just prior to reducing the pressure, 0.275 g of 1(4), 8(11), 15(18), 22(25) tetra[4(2 ethylhexylcarbonyl) phenoxy] phthalocyanine (PcH$_2$) were mixed with 10 g of butanol and added to the reaction. The pressure was then reduced from atmospheric to 120 mm Hg over 10 minutes and held for an additional 10 minutes. The pressure was then ramped down to 20 mm Hg over 10 minutes and then to 5 mm Hg over the next 10 minutes. The reaction was held under these conditions for 10 minutes. Nitrogen flow to the vessel was increased until the pressure returned to atmospheric and the reaction was terminated. The resultant molten polymer was poured from the flask into a suitable container for cooling and allowed to crystallize. This material had an intrinsic viscosity of about 0.18 and was mechanically ground using a Wiley Mill available from Thomas Scientific to a mean particle size of about 1.5 mm.

EXAMPLE 5

In this example the resin of Example 4 was melt blended with PET spun into multifilament PET fibers. The resulting fibers can be used in garments or labels as a positive identification against counterfeit articles. This has also been done using polypropylene fibers.

EXAMPLE 6

In this example, an ink was produced using the pigment particles of Example 2. The pigment was mechanically ground in a rotory grinder to 1.5 mm and subsequently jet-milled in a Trost bench top unit to an average particle size of 4 microns. The resultant "pigment" particles were mixed into a flexo ink vehicle (water based and oil based systems have been used) at a loading level of 2 weight %. The resultant ink was used on a flexo press to print information onto bond paper. The printed information was not visible to the human eye but could easily be read using an appropriate near infrared detector having a excitation wavelength of about 690 nm to about 710 nm.

Although the present invention has been described in terms of the presently preferred embodiment, it is to be understood that such disclosure is not to be interpreted as limiting to the invention described herein. No doubt that after reading the disclosure, various alterations and modifications will become apparent to those skilled in the art to which the invention pertains. It is intended that the appended claims be interpreted as covering all such alterations and modifications as fall within the spirit and scope of the invention.

What is claimed is:

1. A fluorescent particulate marking composition comprising:
   a. a crystalline thermoplastic polyester resin having residues of at least one dicarboxylic acid and having an intrinsic viscosity (IV) of less than about 0.37; and
   b. a near-infrared fluorescing compound having a fluorescence between about 650 nm to about 2500 nm associated with said crystalline thermoplastic polyester in copolymerized form,
   wherein said marking composition has a mean particle size in the range of 0.1 to about 10 microns, and said near-infrared fluorescing compound is present in said marking composition in an amount in the range of from about 10 ppm to 5,000 ppm and is invisible to the unaided eye.

2. The composition of claim 1 wherein said thermoplastic polyester resin is polybutylene terephthalate having a number average molecular weight in the range of 500 to 5,000.

3. The composition of claim 2 wherein said polybutylene terephthalate has an inherent viscosity in the range of from 0.10 to about 0.18 and a crystallinity in excess of 50%.

4. The composition of claim 1 wherein said near-infrared fluorescing compound is selected from the group consisting of phthalocyanines, 2,3-naphthalocyanines and squaraines.

5. The composition of claim 1 wherein said near infrared fluorescent compound is selected from the group consisting of phthalocyanines, 2,3-naphthalocyanines and squaraines corresponding to Formulae I, II and III:

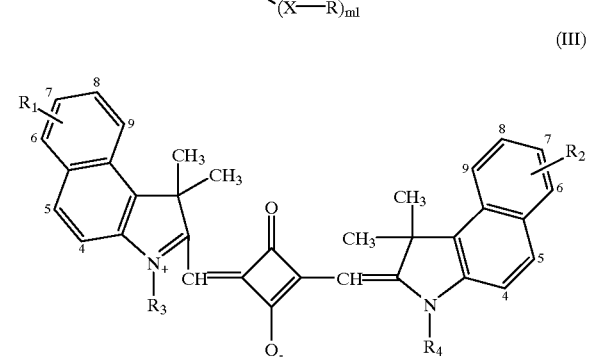

where Pc and Nc represent the phthalocyanine and naphthalocyanine moieties of Formulae Ia and IIa, Phthalocyanine

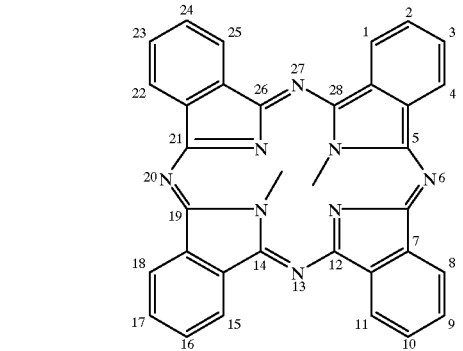

2,3-Naphthalocyanine

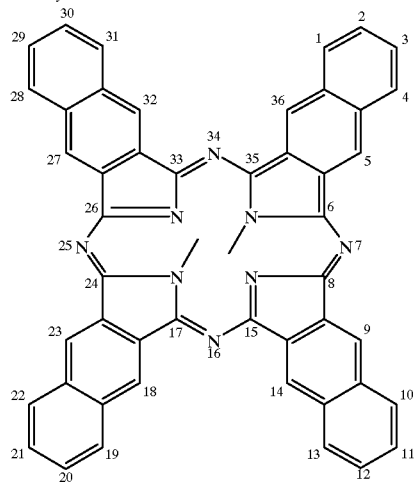

IIa

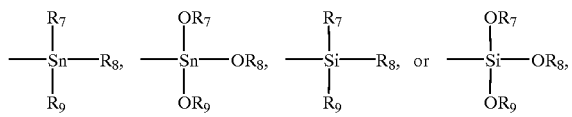

wherein $R^1$ is hydrogen or R is as defined above; z is an integer from 1 to 4; or two (X—R) moieties can be taken together to form divalent substituents of the formula:

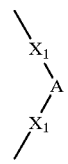

wherein each $X_1$ is independently selected from the group consisting of —O—, —S—, and —N($R_{10}$)— and A is selected from the group consisting of ethylene; propylene; trimethylene; and such groups substituted with $C_1$–$C_4$ alkyl, $C_1$–$C_4$ alkoxy, aryl and cycloalkyl; 1,2-phenylene and 1,2-phenylene containing 1–3 substituents selected from the group consisting of $C_1$–$C_4$ alkyl, $C_1$–$C_4$ alkoxy and halogen;

$R_1$ and $R_2$ are independently selected from the group consisting of hydrogen, lower alkyl, lower alkoxy, halogen, aryloxy, lower alkylthio, arylthio, lower alkylsulfonyl; arylsulfonyl; lower alkylsulfonylamino, lower alkanoylamine, arylsulfonylamino, cycloalkylsulfonylamino, carboxy, unsubstituted and substituted carbamoyl and sulfamoyl, lower alkoxycarbonyl, hydroxy, lower alkanoyloxy, and groups of the formulae,

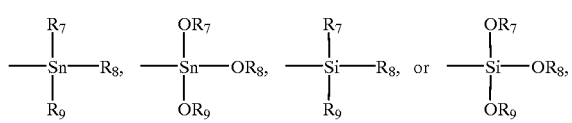

$R_3$ and $R_4$ moieties are independently selected from the group consisting of hydrogen, lower alkyl, alkenyl and aryl; n is an integer from 0–16; $n_1$ is an integer from 0–24, provided the sums of n+m and $n_1+m_1$ are 16 and 24, respectively.

6. The composition of claim 4 wherein said pigment composition has a mean particle size of from about 0.10 microns to about 5 microns.

7. The composition of claim 5 wherein said crystalline thermoplastic polyester resin comprises a polybutylene terephthalate having an intrinsic viscosity of from about 0.10 to about 0.35.

8. The composition of claim 7 wherein said polybutylene terephthalate has an intrinsic viscosity of from about 0.12 to about 0.25.

9. A method for providing a detectable or identifiable marking that is invisible to the unaided eye on a surface of a substrate, said method comprising applying to the surface a marking composition comprising a suitably compatible marking fluid containing the composition of claim 1.

respectively, covalently bonded to a moiety selected from the group consisting of hydrogen and metals selected from the group consisting of AlCl, AlBr, AlOH, $AlOR_5$, $AlSR_5$, Ge, Ge($OR_6$), Ga, InCl, Mg, $SiCl_2$, $SiF_2$, $SnCl_2$, Sn($OR_6$)$_2$, Si($SR_6$)$_2$, or Zn, wherein $R_5$ and $R_6$ are selected from the group consisting of hydrogen, alkyl, aryl, heteroaryl, lower alkanoyl, trifluoroacetyl, groups of the formulae:

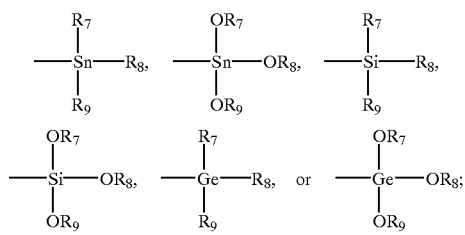

$R_7$, $R_8$, and $R_9$ are independently selected from the group consisting of alkyl, phenyl or phenyl substituted with lower alkyl, lower alkoxy and halogen;

X is selected from the group consisting of oxygen, sulfur, selenium, tellurium and a group of the formula N($R_{10}$), wherein $R_{10}$ is selected from the group consisting of hydrogen, cycloalkyl, alkyl, acyl, alkylsulfonyl, and aryl or $R_{10}$ and R taken together form an aliphatic or aromatic ring with the nitrogen atom to which they are attached;

Y is selected from alkyl, aryl, heteroaryl, halogen or hydrogen,

R is selected from the group consistiong of unsubstituted or substituted alkyl, alkenyl, alkynyl, $C_3$–$C_8$ cycloalkyl, aryl, herteroaryl, and groups of the formulae

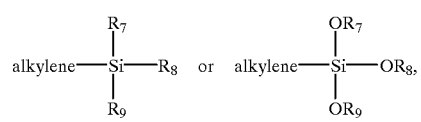

or (X—R) moiety is selected from the group consisting of alkylsulfonylamino, arylsulfonylamino, or a group selected from the formulae —X($C_2H_4O$)$_z R^1$, 10. The method of claim 9 wherein the near-infrared fluorescing compound is selected from the group consisting of
- phthalocyanines, naphthalocyanines and squaraines of claim 5,
- wherein said crystalline thermoplastic polyester resin comprises a polybutylene terephthalate having an intrinsic viscosity of from about 0.12 to about 0.25 and a number average molecular weight in the range of 500 to 5000, and
- wherein said marking composition is contained in said fluid at a loading level of about 2 weight percent.

11. The method of claim 9 wherein said marking composition is applied to the substrate using a letterpress printing process.

12. The method of claim 9 wherein said marking composition is applied to the substrate using a flexographic printing process.

13. The method of claim 9 wherein said marking composition is applied to the substrate using a gravure printing process.

* * * * *